Figure 1:
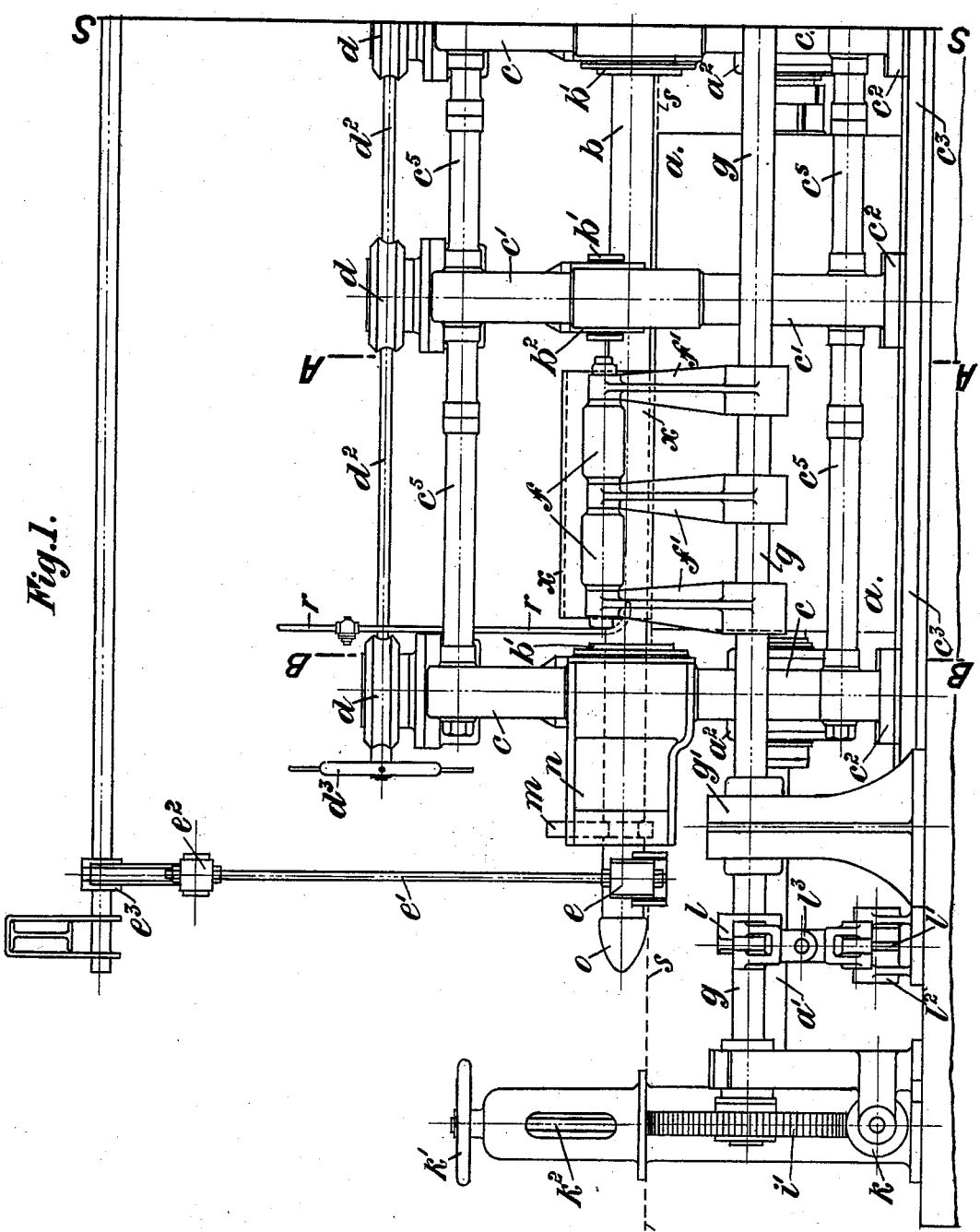

No. 691,727. Patented Jan. 21, 1902.
B. F. McTEAR.
MANUFACTURE OF SEAMLESS AND WELDLESS TUBES OR HOLLOW BODIES.
(Application filed Aug. 15, 1901.)
(No Model.) 6 Sheets—Sheet 1.

Witnesses:
E. B. Bolton

Inventor:
Balfour Fraser McTear
By Richards & Co
his Attorneys.

No. 691,727. Patented Jan. 21, 1902.
B. F. McTEAR.
MANUFACTURE OF SEAMLESS AND WELDLESS TUBES OR HOLLOW BODIES.
(Application filed Aug. 15, 1901.)
(No Model.) 6 Sheets—Sheet 2.
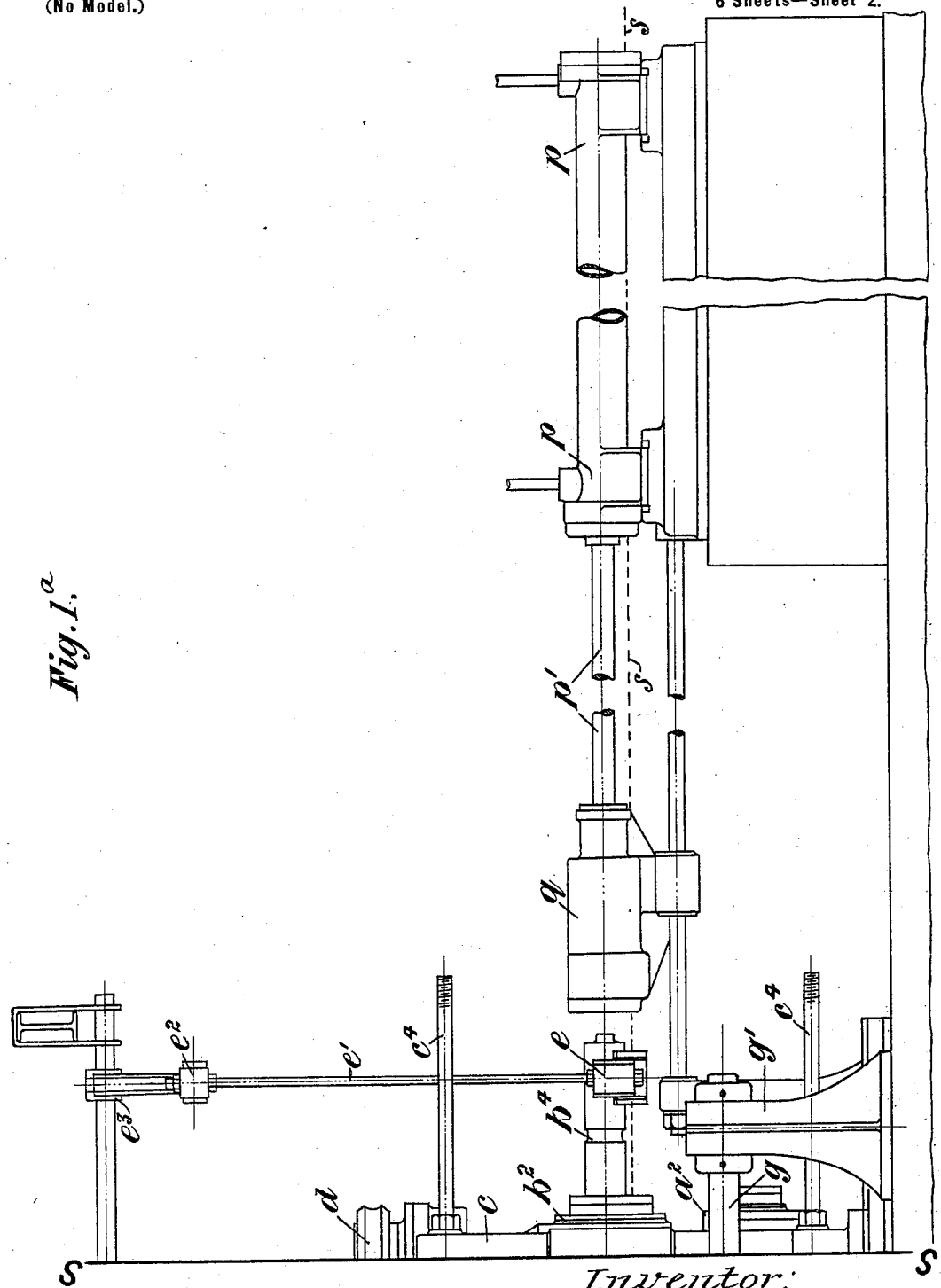

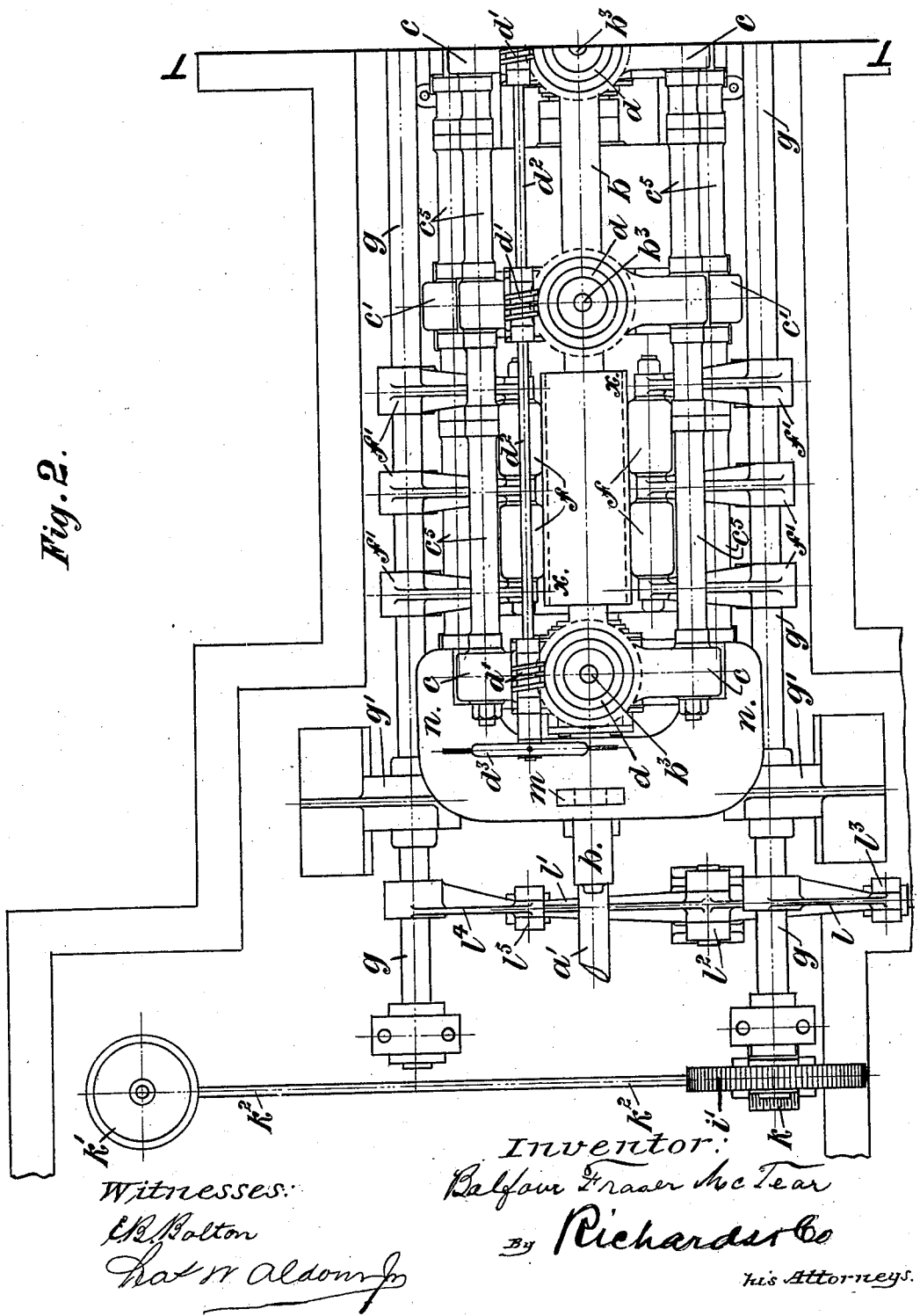

No. 691,727. Patented Jan. 21, 1902.
B. F. McTEAR.
MANUFACTURE OF SEAMLESS AND WELDLESS TUBES OR HOLLOW BODIES.
(Application filed Aug. 15, 1901.)
(No Model.) 6 Sheets—Sheet 4.

*Fig. 2.ᵃ*

Witnesses:
E. B. Bolton
Cha. M. Aldous Jr.

Inventor:
Balfour Fraser McTear
By Richards & Co
his Attorneys.

No. 691,727. Patented Jan. 21, 1902.
B. F. McTEAR.
MANUFACTURE OF SEAMLESS AND WELDLESS TUBES OR HOLLOW BODIES.
(Application filed Aug. 15, 1901.)
(No Model.) 6 Sheets—Sheet 5.

Witnesses:
E. B. Bolton

Inventor:
Balfour Fraser McTear
By Richards & Co
his Attorneys

No. 691,727. Patented Jan. 21, 1902.
B. F. McTEAR.
MANUFACTURE OF SEAMLESS AND WELDLESS TUBES OR HOLLOW BODIES.
(Application filed Aug. 15, 1901.)
(No Model.) 6 Sheets—Sheet 6.
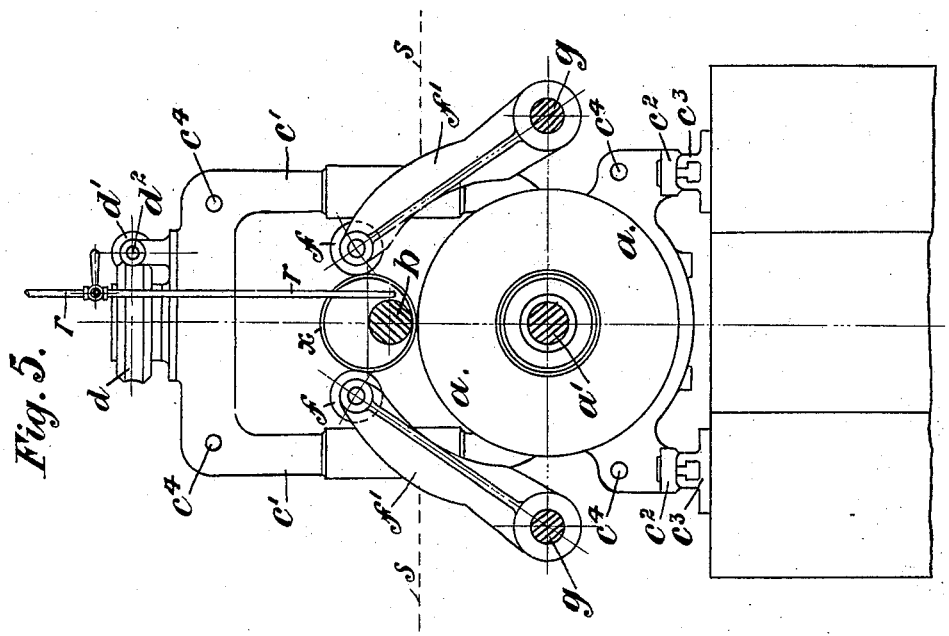
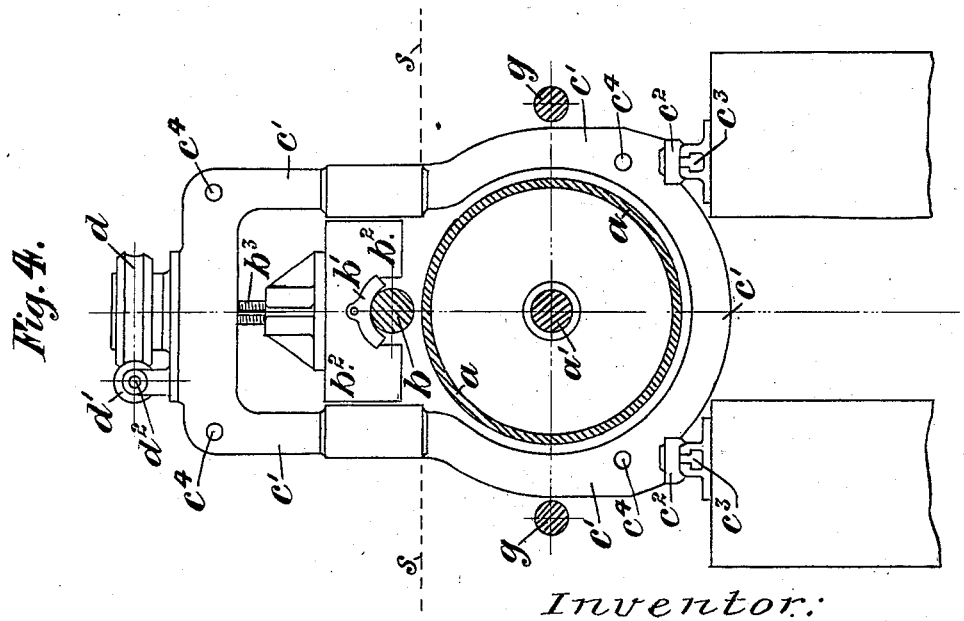
Witnesses
E. B. Bolton
Inventor:
Balfour Fraser McTear
By Richards & Co.
his Attorneys.

UNITED STATES PATENT OFFICE.

BALFOUR FRASER McTEAR, OF RAINHILL, ENGLAND.

MANUFACTURE OF SEAMLESS AND WELDLESS TUBES OR HOLLOW BODIES.

SPECIFICATION forming part of Letters Patent No. 691,727, dated January 21, 1902.

Application filed August 15, 1901. Serial No. 72,091. (No model.)

*To all whom it may concern:*

Be it known that I, BALFOUR FRASER MC-TEAR, a subject of the King of England, and a resident of Rainhill, in the county of Lancaster, England, have invented new and useful Improvements in and Connected with the Manufacture of Seamless and Weldless Tubes or Hollow Bodies, of which the following is a specification.

This invention has reference mainly to the manufacture of hollow cylinders or cylindrical bodies of steel and other hard metals or alloys; and it has more particularly for its objects and effects to provide new or improved modes of operating upon or manipulating tubular bodies in the process of manufacture, whereby the crude or rough hollow billets or bodies (generally externally-cylindrical bodies) while in a highly-heated or glowing state have the thickness of their walls reduced and their diameter increased and are rendered truly cylindrical and of uniform thickness annularly and throughout their length and rapidly in one heat, while at the same time a smooth and fine surface finish is imparted to the article. All the operations are carried on in the one machine, and these with their several objects and effects are hereinafter described.

The complete set of operations performed on the body while in the course of manufacture or treatment in the machine is as follows: The rough pierced or hollow body or cylinder in a highly-heated or glowing state is placed in the machine (the internal roller being withdrawn longitudinally) and supported externally. This internal roller containing the head or tool on its end is then pressed longitudinally in the direction of the axis of the bore of the body and passed through it, the bore removing in this passage all scale or other adhering and detachable matters on the inside surface of the body. The next action is, the bearings of this roller are brought onto it by their adjusting means and the guide-rollers brought onto the external surface of the body, as above referred to. The machine is then started and is driven at a high velocity—say with a peripheral rate of speed of rollers and body under operation of about two thousand feet per minute—and the scavenging jet or blast of steam or air is set going, sweeping over the interior surface from one end to the other. The bearings of the internal roller are now pressed down by their adjusting means, and the internal roller is thus brought closer to the external roller. Obviously as the distance between these two rollers becomes less the thickness of the metal body being operated upon becomes reduced and its diameter increased gradually but quickly. During the progress of this increase the external supporting or guide rollers are moved outward mechanically until the required diameter and thickness are reached. The effects described take place gradually, but rapidly, a rough billet being reduced in thickness and brought to the required thickness and uniform throughout in a very short time and in one heat. This is rendered capable of being done by the high rate of rotation or peripheral velocity at which the body is moved while under treatment, it being in effect a high-velocity spinning operation. The cylinder or tube thus produced will still be at a relatively high heat—say a dull red—and it is now suddenly reduced in temperature, by pouring water on it, to a relatively cool and hard state while still being rolled under the action of the rollers, and this is continued with the rollers in the same relative position for some time, with the result that a planishing action and effect is produced, the tube or cylinder turned out having a smooth and black planished surface. The machine is then stopped, the movable or adjustable bearings taken off the internal roller, this roller withdrawn longitudinally from the finished tubular body or cylinder, and the tube or cylinder taken away. The machine is then ready to receive another rough-pierced or hollow body.

Figure 3:
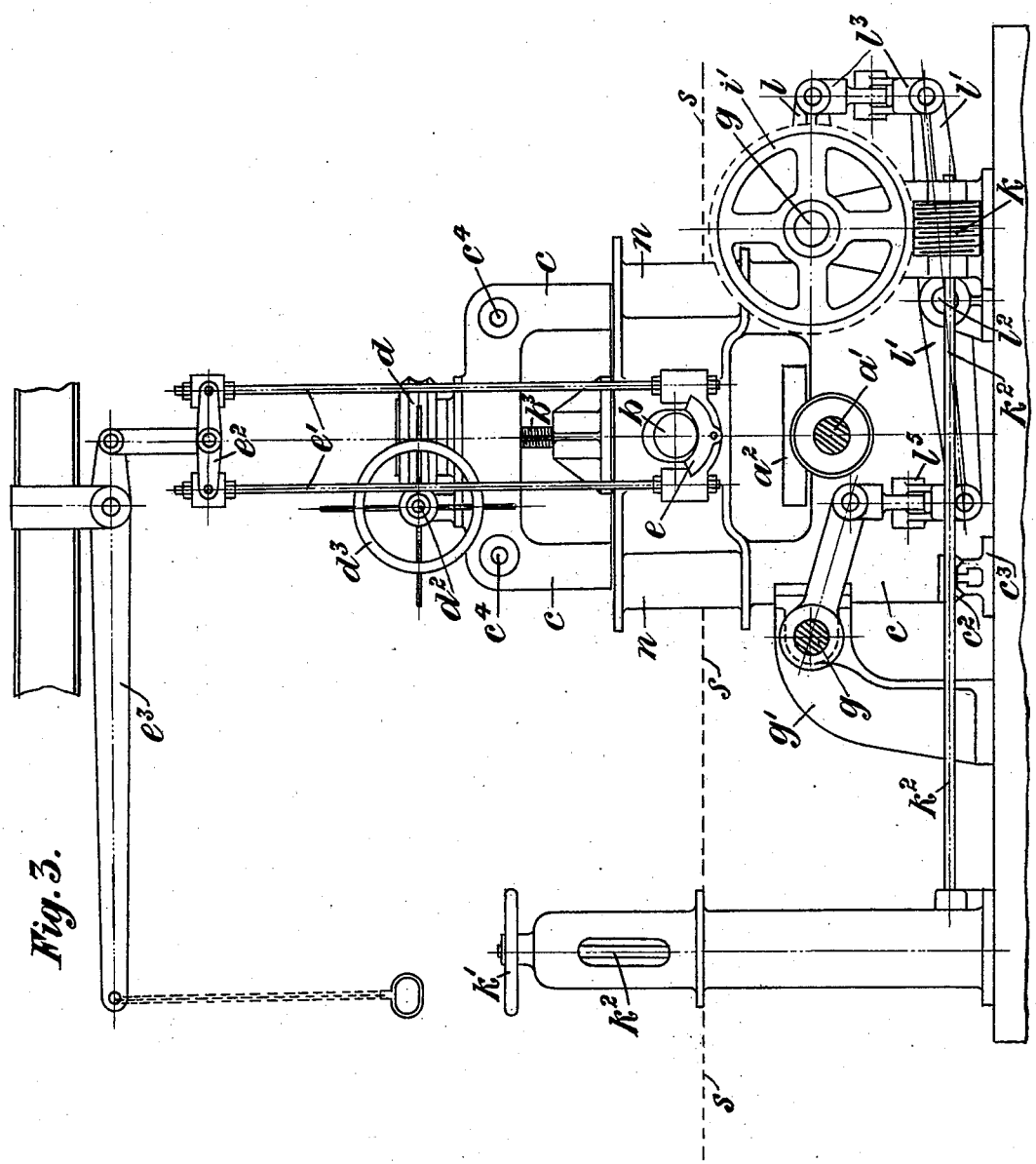

In the drawings, Figures 1 and 1ª constitute a longitudinal elevation. Figs. 2 and 2ª constitute a plan, these views being divided and placed each on two sheets on account of lack of space on one sheet for the entire view without reducing the scale in too great a degree. Fig. 3 is an end view of a machine adapted to carry out the manufacture of tubes or cylinders herein described, while Figs. 4 and 5 are cross-sections at A A and B B, respectively, in Fig. 1.

Referring to the drawings, *a* is the lower or external roller, and $b$ is the upper and smaller roller.

$a'$ is the driven shaft, by which the roller $a$ is revolved, and $a^2$ represents the bearings at either end of this roller, in which its shaft is supported.

$b'$ represents half-bearings in which the shafts $b$ run, and $b^2$ represents slide-blocks carrying the bearings $b'$.

$c$ represents the two outer frames or housings carrying the bearings $b'$ of the upper roller-slides $b^2$ and their adjusting gear or mechanism, and $c'$ is the intermediate and longitudinally-adjusted housing or frame carrying the intermediate bearing $b'$.

The hollow body or tube is designated $x$.

The adjusting mechanism for moving the bearings $b'$ down and allowing them to be moved up comprises screwed rods $b^3$, fixed on the upper parts of the bearing-supporting side blocks $b^2$, worm-wheels $d$, mounted on the top of the frames or housings $c\,c'$, each having a threaded hole in its boss, the threads of which are adapted to mesh with the threads of the rods $b^3$, worms $d'$, meshing with the worm-wheels $d$, a rod $d^2$, carrying the worms $d'$, and a hand actuating-wheel $d^3$, fixed on the end of this rod. The threaded bore or hub of the worm-wheel $d$ acts as a nut on the threaded shafts $b^3$, and when they are revolved by the turning of the hand-wheel $d^3$ through the worms $d'$ in one or other direction the rods $b^3$ and bearings $b'$ are moved up and down, as the case may be.

$e$ represents the half-bearings supporting the shaft $b$ from below for lifting it when the bearings $b'$ are raised, these bearings $e$ being supported by suspension-bars $e'$, cross-head $e^2$, and lever $e^3$, the latter being supported from above and adapted to be actuated by the chain $e^4$.

The frames or housings $c\,c'$ have feet $c^2$, which rest on a longitudinal bed-frame or girder $c^3$ on each side of the machine, and on these they may be adjusted longitudinally and then clamped or held down in any suitable way. The relative position and distance apart of the frames $c\,c'$ is further secured by tie-bolts $c^4$, which pass through them, and tubular distance-pieces $c^5$ between the frames at the upper and lower corners.

The guide or external side-supporting rollers are designated $f$, and $f'$ represents their supporting-arms.

$g$ represents the shafts carrying the supporting-arms $f'$.

$g'$ represents bearings at the ends of the machine carrying the ends of the shafts $g$.

The shafts $g$ receive axial oscillation for moving the guide-rollers $f$ inward and outward in relation to the vertical plane. The directions of these oscillations of the two shafts are of course opposite in order to simultaneously cause the rollers on the opposite sides to recede from one another and move away from the vertical plane of the machine and, vice versa, approach it. This movement is produced primarily from the spur-wheel $i$, which is loose on its hollow journal and is revolved from the worm $k$, operated by the hand-wheel $k'$ and shafting $k^2$. The motion imparted to the wheel $i$ is transferred to one of the shafts $g$ through a spur-wheel $i'$, fixed on this shaft and meshing with the spur-wheel $i$, and this motion again is transmitted from this shaft $g$ to the other shaft $g$ by the mechanism consisting of an arm $l$ on the primary shaft $g$, a lever $l'$, fulcrumed at $l^2$, a jointed link $l^3$, connecting $l$ with $l'$, an arm $l^4$ on the opposite shaft $g$, and a jointed link $l^5$, connecting $l'$ with $l^4$.

The upper roller $b$ is held in place longitudinally by a horseshoe-shaped key $m$, which fits over a reduced portion of the roller, as shown in Figs. 1 and 2, the key being fitted and supported in a bracket $n$, fixed on the outside of one of the housings or frames $c$. When this key is in place, the shoulders on either side of the reduced portion of the roller prevent its moving. A similar reduced portion or groove $b^4$ is provided at the opposite end of the roller to receive a similar key to $m$ when it is engaged with a hydraulic gear for moving it longitudinally.

$o$ is the head or tool on the end of the roller $b$, employed for clearing out or scraping the interior of the rough or crude hollow billet and which takes place in the act of passing the roller $b$ longitudinally through it after it has been placed in the machine and the machine is being made ready to operate upon it.

The hydraulic apparatus for withdrawing the upper roller $b$ from the tube and housings and placing it in position therein consists of a hydraulic cylinder $p$ of any known suitable kind and a head $q$ on the end of its ram $p'$, the head being hollow to receive the roller end and having a suitable slot to receive a key similar to $m$ and make the necessary temporary connection between them.

$r$ is a steam-pipe supplying steam to the interior of the hollow body $x$, its end being turned round, so that the discharge of steam from it takes place horizontally and impinges on and sweeps over the lower surface of the interior of the body.

The floor from which the machine is worked is shown by the line marked $s$, the level of which is such that it affords facilities and conveniences for manipulating the hollow body or tube $x$.

The action of the machine and the several operations performed upon the billet or hollow body in it are as follows: The bearings $b'$ having been moved up and the upper roller $b$ withdrawn by the hydraulic operating-cylinder $p$, the crude hollow billet or body $x$ is taken in a glowing state and placed in position on the top of the roller $a$ between the guide-rollers $f$, which together form a bed or cradle to receive it, as can be seen clearly in Figs. 1, 2, and 5. Then the roller $b$ is moved forwardly, the cylinder $p$ and its head $o$ inserted into the bore of the billet, and while its (the billet's) outer end is supported against the inner end or surface of the bracket $n$ the head $o$ and roller are pressed longitudinally through it. This act not only threads the roller $b$ through the bore of the billet, but the head or tool $o$, being of a size to scrape the surface of the bore, clears out all scale, cinder, &c., from the interior and prevents their being rolled into the metal in the subsequent rolling operation. When the roller $b$ is in position and held longitudinally, it is disengaged from the hydraulic head $q$, and the bearings $b'$ are brought down by their adjusting-gear, so as to bear on the top of the roller. The guide or supporting rollers $f$ are also moved up to the surface of the body $x$. The lower driven roller $a$ is then set in motion and driven at a high speed, and the steam-blast supplied by the pipe $r$ is also turned on and kept on throughout. Then as the bearings $b$ are pressed down by the attendant operating the hand-wheel $d^3$ the thickness of the billet is reduced and its diameter increased, and as it increases the roller-arms $f'$ are moved back by turning the hand-wheel $k'$, taking with them the rollers, and this is continued until the hollow body or cylinder $x$ is of the required thickness or diameter. The tubular article under operation having been produced by the high-speed spinning operation in the manner specified in one heat will still be of a high temperature—that is, a dull red—and while still being revolved in the rolls is cooled down by injecting water onto it and reduced rapidly from this dull red to a black but still hot state, and the rolling operation, but with the distance apart of the rollers $b$ and $a$ kept constant, is continued for so long as its object and effect—viz., the production of a smooth and planished surface—renders it necessary. After this is accomplished the bearings $b'$ and their guides $b$ are removed upward out of the way, the back end of the roller $b$ is coupled up with a hydraulic head $q$, and it is withdrawn longitudinally from the cylinder or tube $x$.

In the drawings the length of the rollers $a$ $b$ being utilized in connection with the rolling of the body $x$ shown is only about half of their full length, and the intermediate housing or frame $c'$, with its upper bearing $b'$, is adjusted and set on the bed-frames $c^3$, so as to support the roller $b$ near one end of the billet. In the case, however, of longer billets or hollow bodies being operated upon the frame $c'$ will be shifted toward the right-hand housing $c$. Thus the machine is adapted to deal with and spin tubular bodies or billets, short or long.

In cases where the invention is employed in the manufacture of tubes which are of different (smaller or larger) diameter than the body or cylinder $x$ produced by the operation of the machine it will be subsequently operated upon in any known way for the production of such tubes, and the process and treatment performed by this machine are therefore not the final ones, whereas in other cases the diameter and thickness of cylinder or tube required may be that produced in the machine, in which case of course the article as it is delivered from the machine is in these respects the finished article.

What is claimed in respect of the herein-described invention is—

1. In the manufacture of hollow metal cylinders, the process consisting in rolling said cylinders circumferentially at a high rate of revolution, internally and externally, while in a glowing hot state, increasing thereby their diameter and reducing the thickness of metal, and continuing to roll and revolve the cylinder in the same manner without reducing its thickness or increasing its diameter, and subjecting the surfaces thereof to the action of water poured onto it, and the continued rolling, until it has become black and its surfaces planished; substantially as set forth.

2. In the manufacture of hollow metal cylinders, the process consisting in scraping the interior surface of the cylinder longitudinally while in a glowing hot state, by passing a suitable scraper through its bore longitudinally; then rolling said cylinders circumferentially at a high rate of revolution, internally and externally, while in a glowing hot state, and increasing thereby their diameter and reducing the thickness of metal; and continuing to roll and revolve the cylinder in the same manner without reducing its thickness or increasing its diameter, and subjecting the surface thereof to the action of water poured onto it, and the continued rolling, until it has become black and its surfaces planished; substantially as described.

3. In the manufacture of hollow metal cylinders, the process consisting in rolling said cylinders circumferentially at a high rate of revolution, internally and externally, while in a glowing hot state, increasing thereby their diameter and reducing the thickness of metal, and simultaneously directing a fluid jet longitudinally onto and along the bottom of the interior of, and through the cylinder, from one end to the other, and continuing to roll and revolve the cylinder in the same manner without reducing its thickness or increasing its diameter, and subjecting the surfaces thereof to the action of water poured onto it, and the continued rolling, until it has become black and its surfaces planished; substantially as set forth.

In witness whereof I have hereunto set my hand in presence of two witnesses.

BALFOUR FRASER McTEAR.

Witnesses:
JOHN HINDLEY WALKER,
SOMERVILLE GOODALL.